US012633748B2

(12) United States Patent
Ali et al.

(10) Patent No.: US 12,633,748 B2
(45) Date of Patent: *May 19, 2026

(54) TRIPLE-FUNCTION BATTERY ENERGY STORAGE SYSTEM FOR HYBRID MICROGRID SYSTEM

(71) Applicant: THE UNIVERSITY OF MEMPHIS RESEARCH FOUNDATION, Memphis, TN (US)

(72) Inventors: Mohd Hasan Ali, Germantown, TN (US); Morteza Davirankeshavarzi, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,271

(22) Filed: Jan. 2, 2024

(65) Prior Publication Data

US 2024/0154420 A1 May 9, 2024

Related U.S. Application Data

(63) Continuation-in-part of application No. 17/068,679, filed on Oct. 12, 2020, now Pat. No. 11,862,979.

(60) Provisional application No. 62/914,295, filed on Oct. 11, 2019.

(51) Int. Cl.
| | |
|---|---|
| *H02J 3/32* | (2026.01) |
| *H02J 3/38* | (2006.01) |
| *H02J 3/48* | (2006.01) |

(52) U.S. Cl.
CPC ............... *H02J 3/32* (2013.01); *H02J 3/381* (2013.01); *H02J 3/48* (2013.01); *H02J 2300/22* (2020.01)

(58) Field of Classification Search
CPC ....... H02J 3/28–322; H02J 3/381; H02J 3/388
See application file for complete search history.

(56) References Cited

U.S. PATENT DOCUMENTS

| | | | | |
|---|---|---|---|---|
| 2016/0087475 A1* | 3/2016 | Kang | .................. | H02J 3/32 |
| | | | | 320/128 |
| 2020/0064782 A1* | 2/2020 | Li | .................. | G06N 3/08 |
| 2021/0194383 A1* | 6/2021 | Tsuruma | .................. | H02J 3/38 |

OTHER PUBLICATIONS

Jianwei Li, Rui Xiong, Qingqing Yang, Fei Liang, Min Zhang, Weijia Yuan, "Design/test of a hybrid energy storage system for primary frequency control using a dynamic droop method in an isolated microgrid power system", Sep. 1, 2017, Applied Energy, vol. 201, 2017, pp. 257-269 (Year: 2017).*

(Continued)

*Primary Examiner* — Daniel Cavallari
*Assistant Examiner* — David A Shiao
(74) *Attorney, Agent, or Firm* — Wayne Edward Ramage; Baker Donelson

(57) ABSTRACT
An improved "3-in-1" BESS that performs three functions: (1) improving the transient stability in a hybrid AC/DC microgrid (HMG) system during any fault; (2) improving power quality in the HMG during any sudden load change; and (3) mitigating power and frequency fluctuations due to variations in wind speed and solar irradiance in the HMG. The same control and structural design is used for all three functions, and the improved BESS thus is adaptive to the changing operating situations within the HMG, and eliminates the requirement for a number of higher cost auxiliary control devices. The control structure of the improved BESS is simple, so it is easier and cheaper to manufacture, and can be easily implemented in practice, and retro-fit into existing HMGs.

7 Claims, 13 Drawing Sheets

(56)          References Cited

OTHER PUBLICATIONS

M. D. Keshavarzi and M. H. Ali, "Disturbance Resilience Enhancement of Islanded Hybrid Microgrid Under High Penetration of Renewable Energy Resources by BESS," Oct. 12, 2020, 2020 IEEE/PES Transmission and Distribution Conference and Exposition (T&D), Chicago, IL, USA, 2020, pp. 1-5 (Year: 2020).*
X. Li, Z. Li, L. Guo, J. Zhu, Y. Wang and C. Wang, "Enhanced Dynamic Stability Control for Low-Inertia Hybrid AC/DC Microgrid With Distributed Energy Storage Systems," Jul. 5, 2019, in IEEE Access, vol. 7, pp. 91234-91242, 2019. (Year: 2019).*

* cited by examiner

FIG. 1

Battery and three phase
representation of VSC and AC
filter shown in Figure 1

Dynamic model of the VSC power circuit

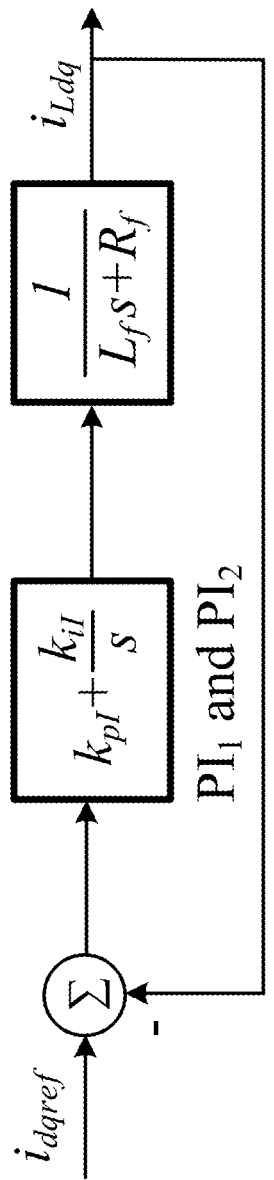
Equivalent model of the current closed-loop
FIG. 4

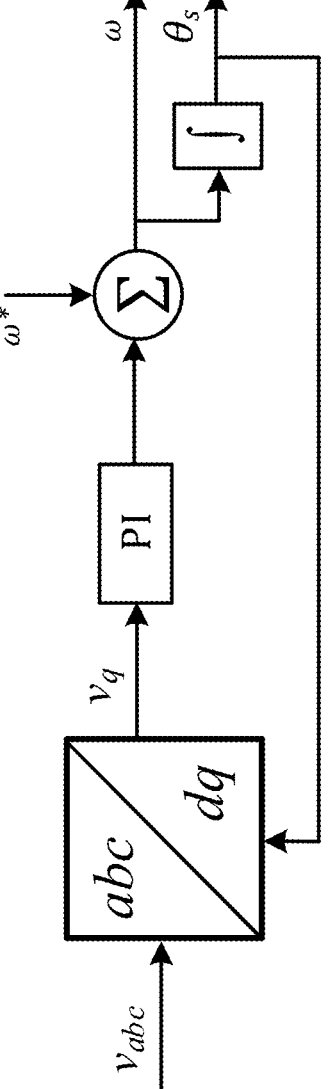
The standard structure of the PLL
FIG. 5

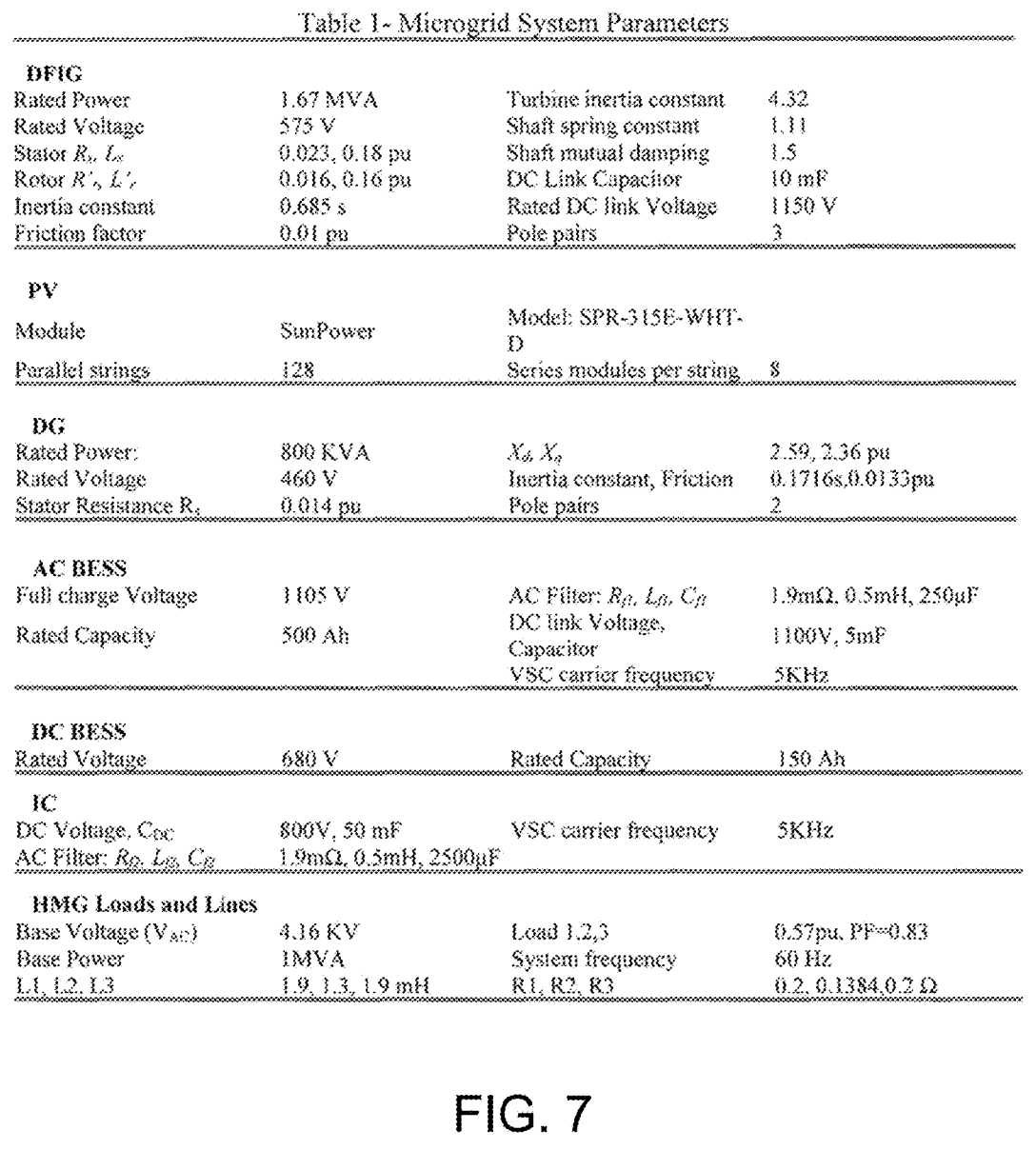

Table 1 - Microgrid System Parameters

DFIG

| | | | |
|---|---|---|---|
| Rated Power | 1.67 MVA | Turbine inertia constant | 4.32 |
| Rated Voltage | 575 V | Shaft spring constant | 1.11 |
| Stator $R_s$, $L_s$ | 0.023, 0.18 pu | Shaft mutual damping | 1.5 |
| Rotor $R'_r$, $L'_r$ | 0.016, 0.16 pu | DC Link Capacitor | 10 mF |
| Inertia constant | 0.685 s | Rated DC link Voltage | 1150 V |
| Friction factor | 0.01 pu | Pole pairs | 3 |

PV

| | | | |
|---|---|---|---|
| Module | SunPower | Model: SPR-315E-WHT-D | |
| Parallel strings | 128 | Series modules per string | 8 |

DG

| | | | |
|---|---|---|---|
| Rated Power | 800 KVA | $X_d$, $X_q$ | 2.59, 2.36 pu |
| Rated Voltage | 460 V | Inertia constant, Friction | 0.1716s, 0.0133pu |
| Stator Resistance $R_s$ | 0.014 pu | Pole pairs | 2 |

AC BESS

| | | | |
|---|---|---|---|
| Full charge Voltage | 1105 V | AC Filter: $R_{fi}$, $L_{fi}$, $C_{fi}$ | 1.9mΩ, 0.5mH, 250µF |
| Rated Capacity | 500 Ah | DC link Voltage, Capacitor | 1100V, 5mF |
| | | VSC carrier frequency | 5KHz |

DC BESS

| | | | |
|---|---|---|---|
| Rated Voltage | 680 V | Rated Capacity | 150 Ah |

IC

| | | | |
|---|---|---|---|
| DC Voltage, $C_{dc}$ | 800V, 50 mF | VSC carrier frequency | 5KHz |
| AC Filter: $R_{fi}$, $L_{fi}$, $C_{fi}$ | 1.9mΩ, 0.5mH, 2500µF | | |

HMG Loads and Lines

| | | | |
|---|---|---|---|
| Base Voltage ($V_{ac}$) | 4.16 KV | Load 1,2,3 | 0.57pu, PF=0.83 |
| Base Power | 1MVA | System frequency | 60 Hz |
| L1,L2,L3 | 1.9 1.3 1.9 mH | R1, R2, R3 | 0.2, 0.13, 4.0.2 Ω |

FIG. 7

TRIPLE-FUNCTION BATTERY ENERGY STORAGE SYSTEM FOR HYBRID MICROGRID SYSTEM

This application is a continuation-in-part application of U.S. patent application Ser. No. 17/068,679, filed Oct. 12, 2020, which claims benefit of and priority to U.S. Provisional App. No. 62/914,295, filed Oct. 11, 2019, both of which are incorporated herein in their entireties by specific reference for all purposes.

FIELD OF INVENTION

This invention relates to a battery energy storage system (BESS). More particularly, the present invention relates to a three-in-one BESS that performs three functions in relation to a hybrid AC/DC microgrid (HMG) system.

SUMMARY OF INVENTION

In various exemplary embodiments, the present invention comprises an improved "3-in-1" BESS that performs three functions: (1) improving the transient stability in a hybrid AC/DC microgrid (HMG) system during any fault; (2) improving power quality in the HMG during any sudden load change; and (3) mitigating power and frequency fluctuations due to variations in wind speed and solar irradiance in the HMG.

The same control and structural design is used for all three functions, and the improved BESS thus is adaptive to the changing operating situations within the HMG, and eliminates the requirement for a number of higher cost auxiliary control devices. The control structure of the improved BESS is simple, so it is easier and cheaper to manufacture, and can be easily implemented in practice, and retro-fit into existing HMGs.

BRIEF DESCRIPTION OF THE DRAWINGS

FIG. 1 shows a BESS control system with single phase representation of a Voltage Source Converter (VSC) and power circuit in grid feeding mode.

FIG. 4 shows an equivalent model of the current closed-loop.

FIG. 5 shows the standard structure of the Phased Locked Loop (PLL).

FIG. 7 shows microgrid system parameters for the system of FIG. 3.

DETAILED DESCRIPTION OF EXEMPLARY EMBODIMENTS

Microgrids and smart grids are gradually evolving from conventional power systems. In microgrids, interconnected sub-grids govern power distribution with high penetration of renewable energy resources and energy storage systems. In a hybrid AC/DC microgrid (HMG) system, operational functionalities of both AC and DC currents are made available in order to avoid frequent conversions (i.e., from AC to DC and from DC to AC) so as to minimize energy losses and also to feed DC loads directly. Microgrids typically comprise a combination of distributed energy resources or assets (DER), such as, but not limited to, a combined heat-and-power system, solar panels, wind-generators or turbines, fuels cells, and energy storage (e.g., a battery energy storage system, or BESS). In a microgrid, a battery energy storage system (BESS) is used mainly for peak shaving (i.e., the process of reducing the amount of energy purchased or obtained from a utility company during peak demand hours by using an alternative localized power source), and for minimization of frequency and power fluctuations resulting from solar irradiance variation or wind speed change (for solar or wind-based energy sources). DER are managed by a microgrid controller and a network of auxiliary control devices to help achieve grid resiliency, which generally encompasses reducing and coping with power outages efficiently, lessening the impact of an outage, and regrouping from an outage quickly.

In the event of a utility grid outage, the microgrid will safely disconnect to the "island" from the grid, support critical loads in the microgrid, and then reconnect when the outage event has been corrected (i.e., grid-connected mode). Improving resiliency and transient stability during large signal disturbances in an "islanded" HMG comprising different DER is a challenging task. Typically, in prior art systems, auxiliary control devices such as a series dynamic braking resistor (SDBR), fault current limiters, and the like, are used to improve the transient stability of the HMG system, which incur higher additional costs.

In several embodiments, the present invention comprises an improved "3-in-1" BESS that performs three functions: (1) improving the transient stability in the HMG during any fault; (2) improving power quality in the HMG during any sudden load change; and (3) mitigating power and frequency fluctuations due to variations in wind speed and solar irradiance in the HMG.

The same control and structural design are used for all three functions, and the improved BESS thus is adaptive to the changing operating situations within the HMG and eliminates the requirement for a number of higher cost auxiliary control devices. The control structure of the improved BESS is simple, so it is easier and cheaper to manufacture, and can be easily implemented in practice, and retrofit into existing HMGs.

Figure 1:
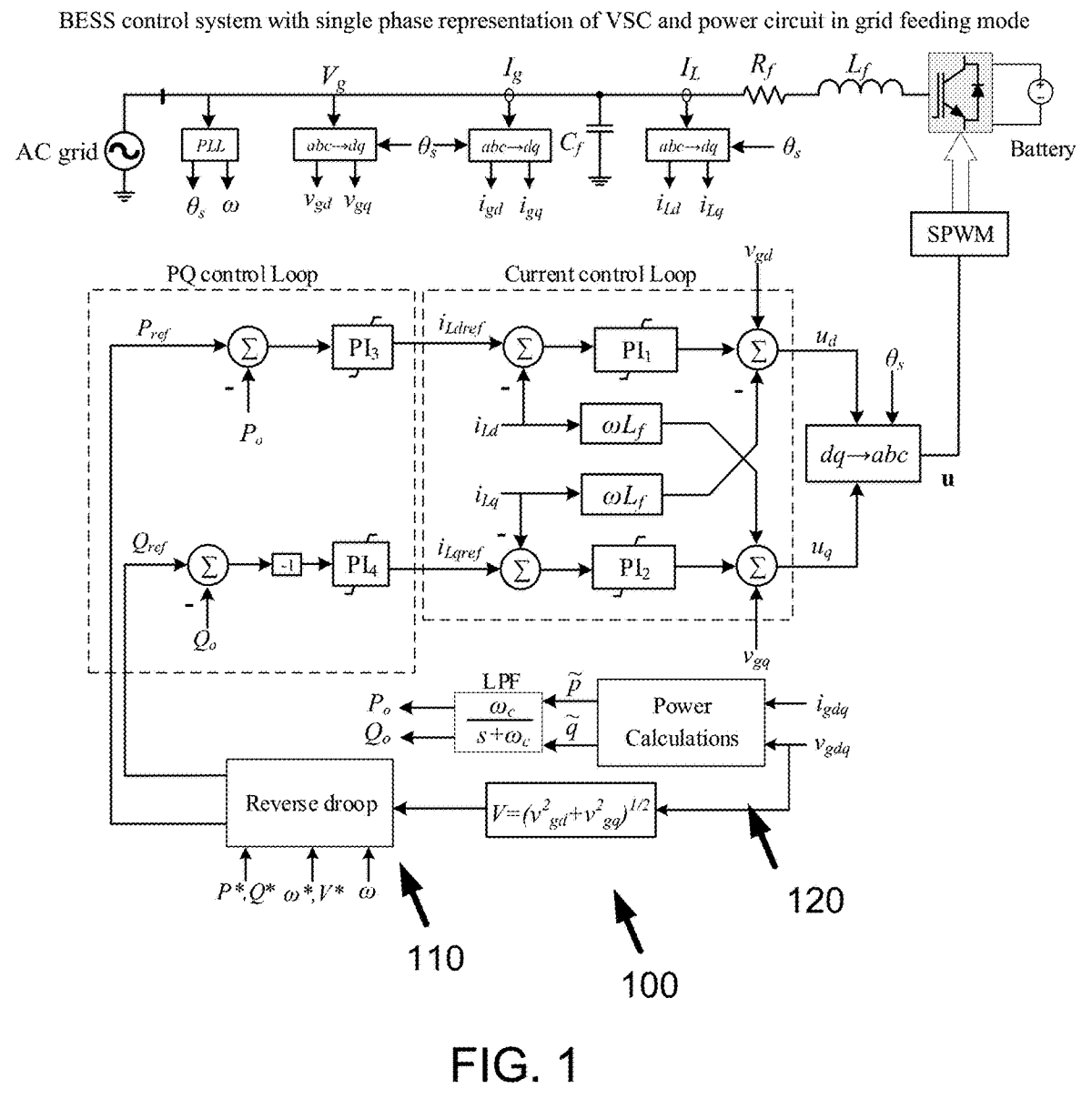
Figure 2:
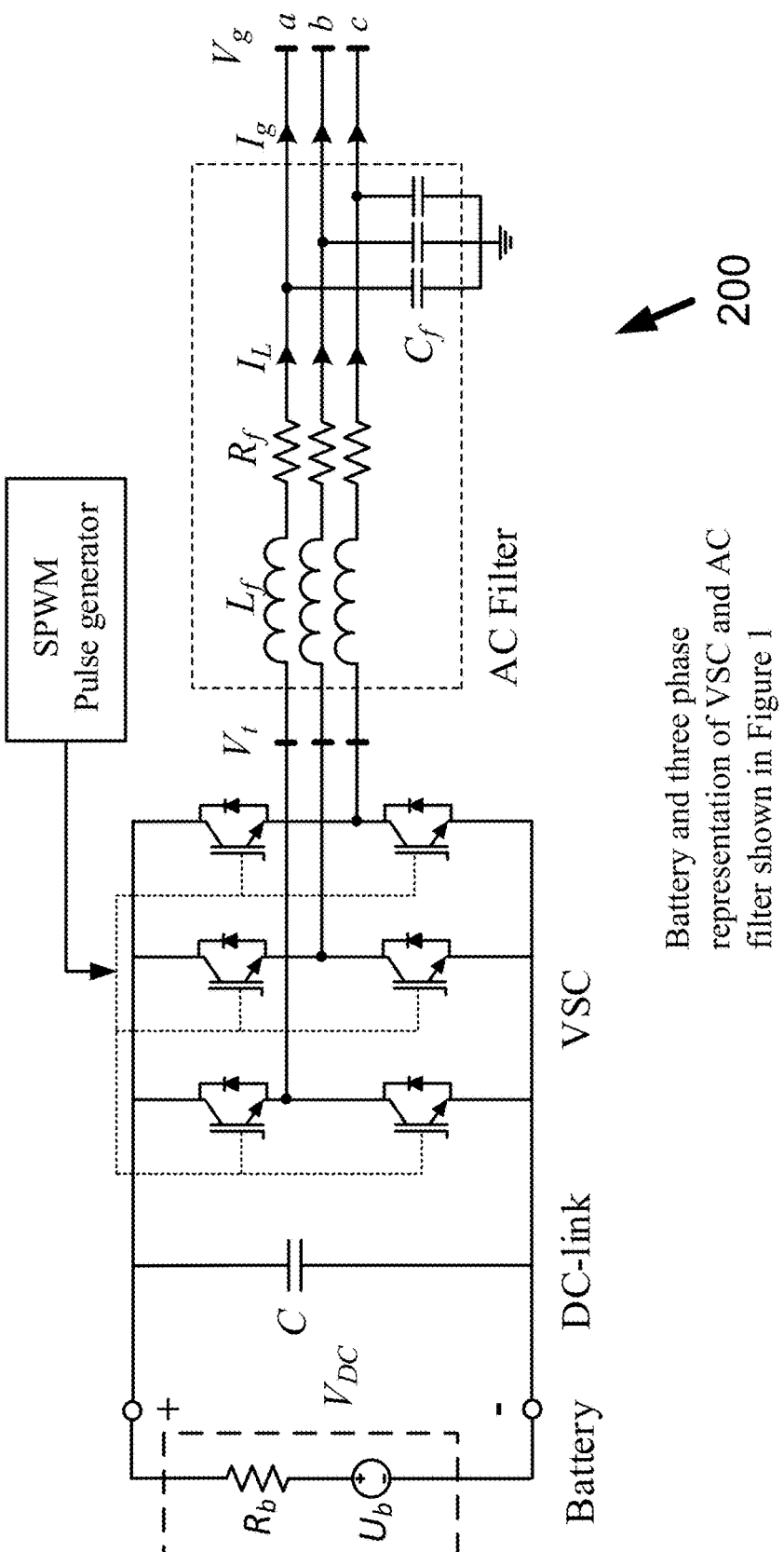
FIG. 2 shows a battery and three-phase representation of VSC and AC filter shown in FIG. 1.

An example of a BESS control system 100 in accordance with the present invention together with a single-phase representation of the converter/AC filter power circuit is shown in FIG. 1. FIG. 2 shows the three-phase power circuit 200 of a two-level, three-phase VSC along with the AC filter and DC-link capacitive filter. It is called two-level because the output AC terminals can have either of the $-V_{dc}$ or $V_{dc}$ values at a time.

The VSC connects the energy storage (battery) to the AC subgrid. When transferring power from the DC link to the AC side, it works as an inverter, and when exchanging power from the AC side to DC link, it works as a rectifier. The power electronic switches in this invention are Insulated Gate Bipolar Transistors (IGBTs) and are driven by a sinusoidal pulse width modulator (or modulation) (SPWM) to generate a sinusoidal waveform at the AC side. The pulse width is controlled by a modulation reference waveform (MRW), while the output pulse amplitude is equal to the DC-link voltage. During the time that power switches are OFF the current flows from AC side to DC side through anti-parallel diodes if the AC side amplitude is greater than the DC-link voltage at the same time. The MRW is generated by the modulation index, which varies in the range [0,1], and carrier frequency, which is the SPWM switching frequency. Due to the switching operation, the input/output currents have switching harmonics. The AC filter restricts the harmonics in AC side current while the capacitor ($C_f$) filters the ripples in the DC-link voltage. The next part provides more details about the VSC.

VSC Control System in dq Reference Frame

In a VSC-based HMG, the energy storage power converters in the AC subgrid and Interlinking Converter (IC) can be controlled to achieve certain control objectives. In fact, this capability is a remarkable competency of the modern HMGs (and AC microgrids) compared to the conventional power systems as they flexibly integrate the distributed RES and energy storage. The control scheme can be implemented in the natural reference frame (NRF) or abc, stationary reference frame (SRF) or $\alpha\beta$ and rotational reference frame (RRF) or dq. The NRF is challenging to implement as it deals with complex sinusoidal signals and decoupling the active and reactive currents is impossible. SRF deals with decoupled sinusoidal signals ($\alpha\beta$) and hence can be used for harmonic control using proportional resonance (PR) controllers and virtual impedance implementation. However, the RRF converts three-phase sinusoidal signals to two DC direct and quadrature (dq) axes which can be easily used in linear control type controllers like Proportional-Integral (PI) compensators. If decoupled effectively, the dq control provides accurate active and reactive power control along with reverse droop control 110. The VSC can be operated in grid-forming, grid-following (or grid-feeding) and DC voltage control modes depending on the application and the control objectives in HMG. In the grid-forming mode, VSC controls the AC subgrid voltage and frequency and operates in the islanded mode of the microgrid. The reference values of voltage magnitude and angular frequency (or phase angle) are generated by the droop technique if more than one grid-forming VSC operate in the grid. The dynamic modeling of the power stage of a VSC starts by writing the Kirchoff's Voltage Law (KVL) equations for the inductor current in the abc frame and then converting them into RRF to acquire a dq decoupled control stage. It is assumed that VSC terminal voltage $V_t$ is an averaged value of the DC side and pulse width modification (PWM) switching operation. From FIG. 2 we have:

$$v_t = L_f \frac{di_L}{dt} + R_f i_L + v_g \quad \text{where} \tag{1}$$

$$v_t = \begin{bmatrix} V_{ta} \\ V_{tb} \\ V_{tc} \end{bmatrix} \quad i_L = \begin{bmatrix} I_{La} \\ I_{Lb} \\ I_{Lc} \end{bmatrix} \quad v_g = \begin{bmatrix} V_{ga} \\ V_{gb} \\ V_{gc} \end{bmatrix} \tag{2}$$

Transforming (1) directly from abc frame to dq (RRF) it yields:

4

$$v_{tdq} = L_f \frac{di_{Ldq}}{dt} + j\omega L_f i_{Ldq} + R_f i_{Ldq} + v_{gdq} \tag{3}$$

$$v_{tdq} = \begin{bmatrix} v_{td} \\ v_{tq} \end{bmatrix} \quad i_{Ldq} = \begin{bmatrix} i_{Ld} \\ i_{Lq} \end{bmatrix} \quad v_{gdq} = \begin{bmatrix} v_{gd} \\ v_{dq} \end{bmatrix} \tag{4}$$

assuming that d-axis in dq frame is aligned with a-phase in abc frame. The transformation matrix for any variable X from abc frame to dq frame is given by the Park transformation as follows:

$$X_{dq} = TX_{abc} \tag{5}$$

$$T = \frac{3}{2} \begin{bmatrix} \cos\theta_s & \cos\left(\theta_s - \frac{2\pi}{3}\right) & \cos\left(\theta_s + \frac{2\pi}{3}\right) \\ -\sin\theta_s & -\sin\left(\theta_s - \frac{2\pi}{3}\right) & -\sin\left(\theta_s + \frac{2\pi}{3}\right) \end{bmatrix}$$

where $\theta_s$ is the angle difference between dq and abc frames. $T^{-1}$ is used to transform dq frame variables to abc frame. It should be noted that by the operation of the phase locked loop (PLL) in the steady-state, $\theta_s=0$ and d-axis is fully aligned with a-phase. Assuming that $X_{dq}=X_d+jX_q$, equation (3) can be expressed in d and q axes for inductor current dynamics by decomposing into real and imaginary terms we obtain:

$$L_f \frac{di_{Ld}}{dt} = v_{td} + \omega L_f i_{Lq} - R_f i_{Ld} - v_{gd} \tag{6}$$

$$L_f \frac{di_{Lq}}{dt} = v_{tq} - \omega L_f i_{Ld} - R_f i_{Lq} - v_{gd}$$

The PLL function will be briefly discussed in the next parts. Equation (6) expresses the mathematical model of the inductor dynamics in terms of converter terminal and grid voltages as converter reference generating and disturbance signals. The dynamics of capacitor voltage can also be derived similarly by writing the Kirchoff's Current Law (KCL) for the capacitor node in FIG. 2:

$$C_f \frac{dv_g}{dt} = i_L - i_g \tag{7}$$

where $i_g = [I_{ga} I_{gb} I_{gc}]^T$. Transforming to dq space and decoupling the real and imaginary terms it holds:

$$C_f \frac{dv_{gd}}{dt} = \omega C_f v_{gq} + i_{Ld} - i_{gd} \tag{8}$$

$$C_f \frac{dv_{gq}}{dt} = -\omega C_f v_{gd} + i_{Lq} - i_{gq}$$

Figure 3:
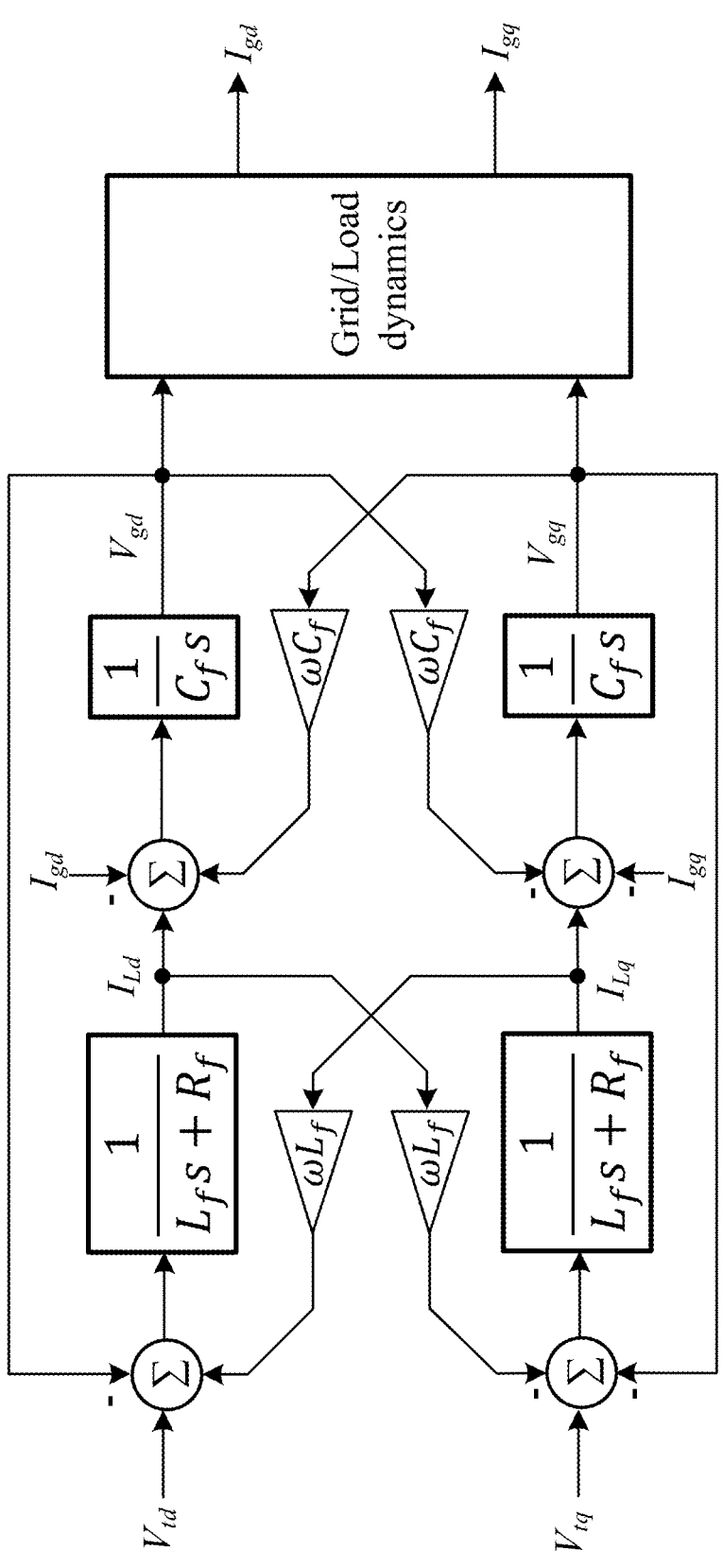
FIG. 3 shows a dynamic model of the VSC power circuit.

Combining (6) and (8) equations result in an averaged dynamic model of the power circuit of the VSC shown in FIG. 3. $v_{td}$ and $v_{tq}$ are the averaged dq values of VSC terminal voltage at AC side that are generated by the modulation index u:

$$v_t = u\frac{V_{dc}}{2}, u^T = [u_a \ u_b \ u_c] \tag{9}$$

-continued $$u_a = u(t)\cos(\omega t + \theta_0) \tag{10}$$

$$u_b = u(t)\cos\left(\omega t + \theta_0 - \frac{2\pi}{3}\right)$$

$$u_c = u(t)\cos\left(\omega t + \theta_0 + \frac{2\pi}{3}\right)$$

$$0 \le u(t) \le 1$$

where $\theta_0$ is the initial and/or arbitrary phase angle of the VSC and u is the vector of the variable modulation indexes generated by the control system.

$$u_{dq} = u_d + ju_q \tag{11}$$

$$u(t) = \sqrt{u_d^2 + u_q^2}$$

where $u_d$ and $u_q$ are respectively d- and q-axis reference generating signals from control system. They are generally DC signals in the steady-state operation that are perturbed during transients. $\omega t$ is the phase angle generated by either droop control for a grid-forming or by the PLL for a grid-feeding VSC. In the general form, we have:

$$\omega t = \theta_s = \int \omega(t)dt \tag{12}$$

where $\omega(t)$ is treated as the time-varying angular frequency generated by droop equations or detected by the PLL. Grid\load dynamics in FIG. 3 is the equivalent model of the VSC external network connected to $V_g$ terminal. In case of a stand-alone VSC and its load, the load current is simply equal to $I_g$. While in the networked microgrids with the operation of several DERs and other grid components, the load is shared between DERs. In general form, load dynamics are modeled by the state-space representation in which the dynamics of different DERs and grid components can be combined to form a multi-input multi output (MIMO) system.

The VSC is modeled as an independent averaged ac source discussed earlier. The control has two inner loops of current and power control. The power control loop generates current references using the reverse droop calculations. $PI_1$-$PI_4$ controllers are tuned based on the converter time response and output filter dynamics. The current loop's bandwidth is assumed to be faster than the power control loop by at least one decade in frequency response measure. In this way, it can be ensured that during the current loop transients the PI outputs in the power loop do not change significantly. The dq components of the measured voltage ($V_g$) and currents ($I_L$, $I_g$) are calculated using the Park transformation (abc→dq) in (5). Usually, low pass filters are used to suppress the switching harmonics from the measured signals which are neglected for simplicity. The current control loop has the following mathematical form:

$$u_d = k_{pI}(i_{dref} - i_{Ld}) + k_{iI}\int(i_{dref} - i_{Ld})dt + v_{gd} - \omega L i_{Lq}$$

$$u_q = k_{pI}(i_{qref} - i_{Lq}) + k_{iI}\int(i_{qref} - i_{Lq})dt + v_{gq} + \omega L i_{Ld} \tag{13}$$

where $i_{dref}$ and $i_{qref}$ are the reference values of inductor dq current generated by the power control loop and $k_{pI}$ and $k_{iI}$ are the proportional and integral coefficients of the current controllers ($PI_1$ anPI$_2$) respectively. Feed-forward terms ($v_{gdq}$, $\omega L i_{Ld}$, $-\omega L i_{Lq}$) are added to $u_d$ and $u_q$ to cancel the effect of $V_g$ and $I_L$ to decouple the d and q axes to be able to control two axes independently. However, perfect decoupling might not be practically achieved with these feed-forward terms in (13) due to the harmonics and measurement errors. Assuming fully decoupled, the equivalent model of the current control closed-loop takes the form shown in FIG. 4.

$k_{pI}$ and $k_{iI}$ are selected based on the desired response time $\mathcal{T}$ of the converter in current loop. We have:

$$k_{pI} = \frac{L_f}{\mathcal{T}}, k_{iI} = \frac{R_f}{\mathcal{T}} \tag{14}$$

Then current control closed-loop acts as a first order low pass filter with the time constant $\mathcal{T}$ i.e.:

$$i_{Ldq} = \frac{1}{\mathcal{T}s + 1} i_{dqref} \tag{15}$$

The grid-feeding VSC is synchronized with the main grid (or AC subgrid) by the PLL. The PLL has a park transformation block. It detects the phase angle $\theta_s$ between the abc and dq system and smoothly drives $v_q$ to zero to make $v_d$ aligned with the abc reference through a feedback control system. FIG. 5 illustrates the standard structure of the PLL. The quality of PLL control is crucial for stable operation and accurate power delivery. The grid-feeding VSC is suitable for constant power exchange by the grid in applications such as energy storage. If the current control loop is fast enough, it is guaranteed that output active and reactive powers track $P_{ref}$ and $Q_{ref}$ independently. Alternatively, the dq current references can be generated using PI controllers. In this case, the error between the output powers and reference values are passed through PI controllers. Current control loop must be fast enough to separate the transient operation of the current and power loops. The current control loop modeling and controller design are already presented earlier. The mathematical modeling of PQ control loop will lead to nonlinear dynamics as active/reactive powers are the product of voltages and currents. Therefore, the best method to determine the PQ loop PI gains is to tune the parameters by the standard method of tuning PI parameters.

Battery Model

The invention disclosed herein in various embodiments considers the battery State-of-Charge (SoC) for modeling. Here, we use a dynamic model of the lithium-ion battery that has been experimentally analyzed and is widely utilized in the technical literature. The model involves an internal constant source in series with battery resistance. Equations (16) to (18) represent the non-linear dynamic of the battery voltage in charge and discharge mode, respectively:

$$U_b^{ch} = E_0 - K_p\left(\frac{i_b t}{SoC} + \frac{\bar{i}_b}{0.9 - SoC}\right) - R_b i_b + Ae^{-Bi_b t} \tag{16}$$

$$U_b^{dch} = E_0 - K_p \frac{i_b t + \bar{i}_b}{SoC} - R_b i_b + Ae^{-Bi_b t} \tag{17}$$

$$SoC(t) = SoC(0) - \frac{1}{Q}\int_0^t i_b(t)dt = SoC(0) - \frac{i_b t}{Q} \tag{18}$$

where the subscripts ch and dch refer to charge mode and discharge mode parameters. Further:

$E_0$, $R_b$, Q Constant voltage, internal resistance, and charge capacity of the battery.

$K_p$, A, B Polarization constant and exponential zone voltages of the battery.

$U_b$, $i_b$, $\bar{i}_b$ Output voltage, current and filtered current of the battery.

SoC, $SoC_{min}$, $SoC_{max}$ Battery state of charge and its minimum and maximum values.

The operation of the battery is normally constrained between the minimum and maximum SoC ($SoC_{min}$, $SoC_{max}$) to prolong the battery lifecycle. SoC (0) is the initial value of SoC at the beginning of the charge/discharge process. It should be noted that, since the battery SoC range restricts its operation, the load shedding or generation curtailment might be needed in cases that the battery runs out of charge or overcharges.

The system includes functionalities of both a reverse droop based control method (a power control mode used for AC electrical power generators whereby the power output of a generator reduces as the line frequency increases) and a grid-feeding strategy for an inverter interfaced energy storage system. In grid-feeding strategy, the BESS inverter is controlled to inject/absorb active/reactive powers. In this method, by good approximation it is assumed that the inverter output active and reactive power correspond independently to inverter frequency and voltage magnitude, respectively. Therefore, the BESS control system tracks the power references (P*, Q*) applied by power management system. These references can be constant values defined by system operator depending on the grid condition or power mismatches between load and generating resources.

The reverse droop-based control is obtained using P-ω and Q-V droops, where ω and V are AC subgrid voltage and frequency, respectively. The power references are defined as below:

$$P_{ref} = P^* - m_p(\omega - \omega^*) \quad (19)$$

$$Q_{ref} = Q^* - n_q(V - V^*)$$

$$m_p \geq \frac{P_{max} - P_{min}}{\omega^*} \quad (20)$$

$$n_q \geq \frac{V_{max} - V_{min}}{V^*}$$

where * denotes set points, and $m_p$ and $n_q$ are reverse droop gains for power sharing.

In order to enable the BESS to contribute to power fluctuation minimization during intermittent renewable generation, the active power reference is made equal to power balance mismatch:

$$P^* = \Sigma P_L - \Sigma P_G$$

$$P_L = P_{Lac} + P_{loss} + P_{ILC}, \ P_G = P_{DFIG} + P_{DG} \quad (21)$$

where $P_L$ and $P_G$ are total load and generation active powers, $P_{Lac}$ $P_{loss}$, $P_{ILC}$, $P_{DFIG}$ and $P_{DG}$ are respectively total AC load power, distribution losses, IC power, DFIG and DG powers. In this way, the BESS absorbs/injects the amount of power mismatched between load and generation. The reactive power reference Q* depends on the grid voltage control and inverter maximum current limit. The BESS is usually used as an active power device to control the flow of energy. Therefore, Q* is equal to zero. Although the BESS inverter can appropriately be used as a static compensator, the reactive power absorption/injection will limit the active power capability of the inverter.

$P_O$ and $Q_O$ are filtered output powers 120 in FIG. 1, and $\tilde{p}$ and $\tilde{q}$ are respectively calculated unfiltered positive sequence output powers from measured signals.

$$P_o = \frac{\omega_c}{s + \omega_c} \tilde{p} \quad (22)$$

$$Q_o = \frac{\omega_c}{s + \omega_c} \tilde{q}$$

$$\tilde{p} = \frac{3}{2}[v_{gd}i_{gd} + v_{gq}i_{gq}] \quad (23)$$

$$\tilde{q} = \frac{3}{2}[-v_{gd}i_{gq} + v_{gq}i_{gd}]$$

The present invention applies a dual loop decoupled control structure with the reverse droop-based concept to recondition active and reactive reference powers. In this strategy, while the system tracks the applied power references, the reverse droop block adaptively regulates references according to current operating conditions of microgrid voltage and frequency.

Proportional-Integral (PI) controllers are utilized to regulate power and current components. In order to design PI regulators' coefficients ($K_p$, $K_i$), in several embodiments the system is linearized around an operating point that ensures the system stability for different operating conditions. It is noteworthy that the designed coefficient set remains unchanged during any type of disturbances. A question may arise about how one set of coefficients works for all three situations. PI parameters are tuned to have the best response in order to track the active and reactive power references in all situations. In these situations, power balances are affected by disturbances. So, the PIs are first designed for the worst case (that is the fault disturbance) and then fine-tuned to adapt to other disruptions.

Figure 6:
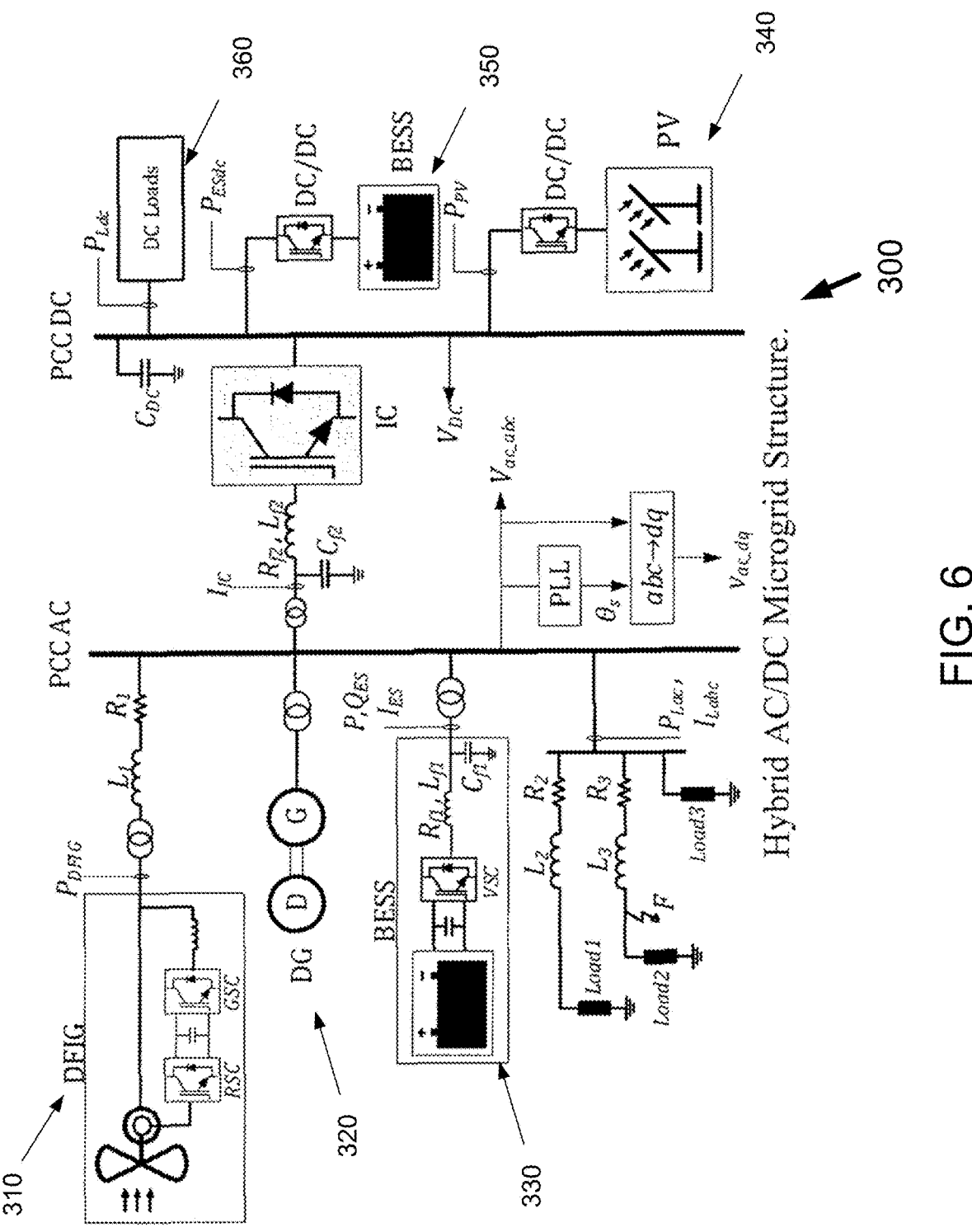
FIG. 6 shows a diagram of an exemplary embodiment of a hybrid AC/DC microgrid structure.
Figure 8:
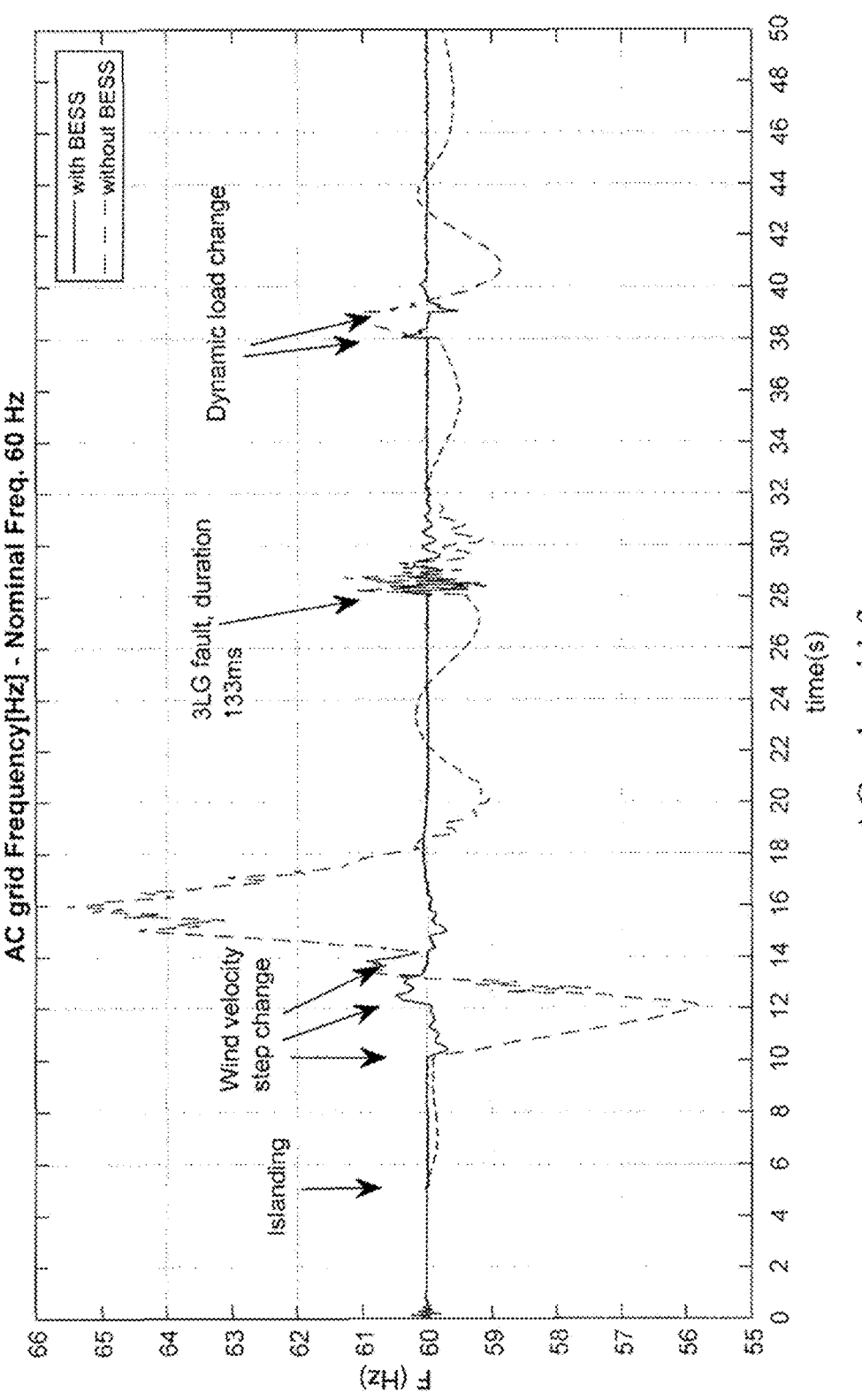
FIG. 8 shows AC sub-grid frequency for the system of FIG. 3.
Figure 9:
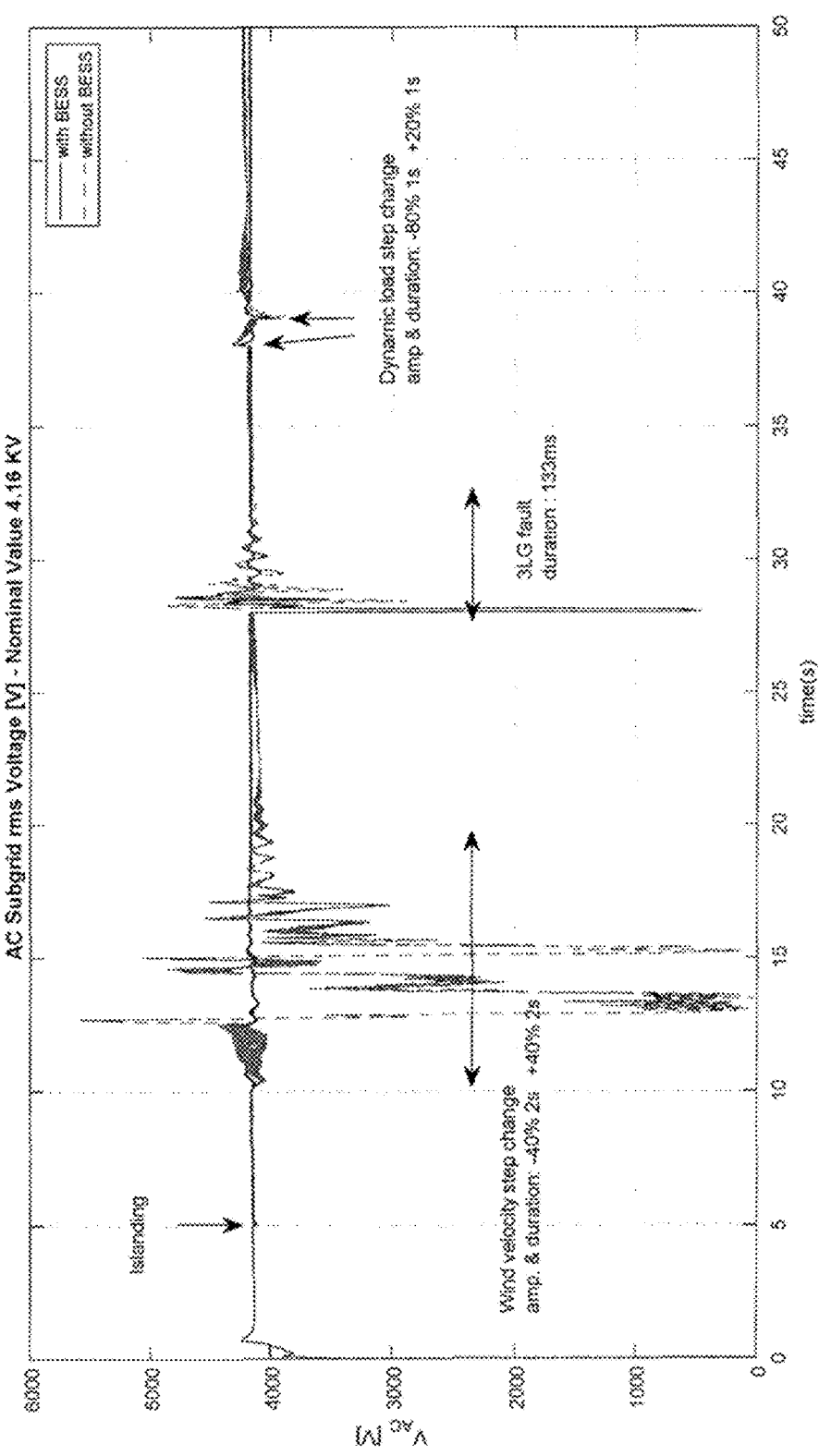
FIG. 9 shows AC sub-grid voltage RMS (root mean square) value (phase A) for the system of FIG. 3.
Figure 10:
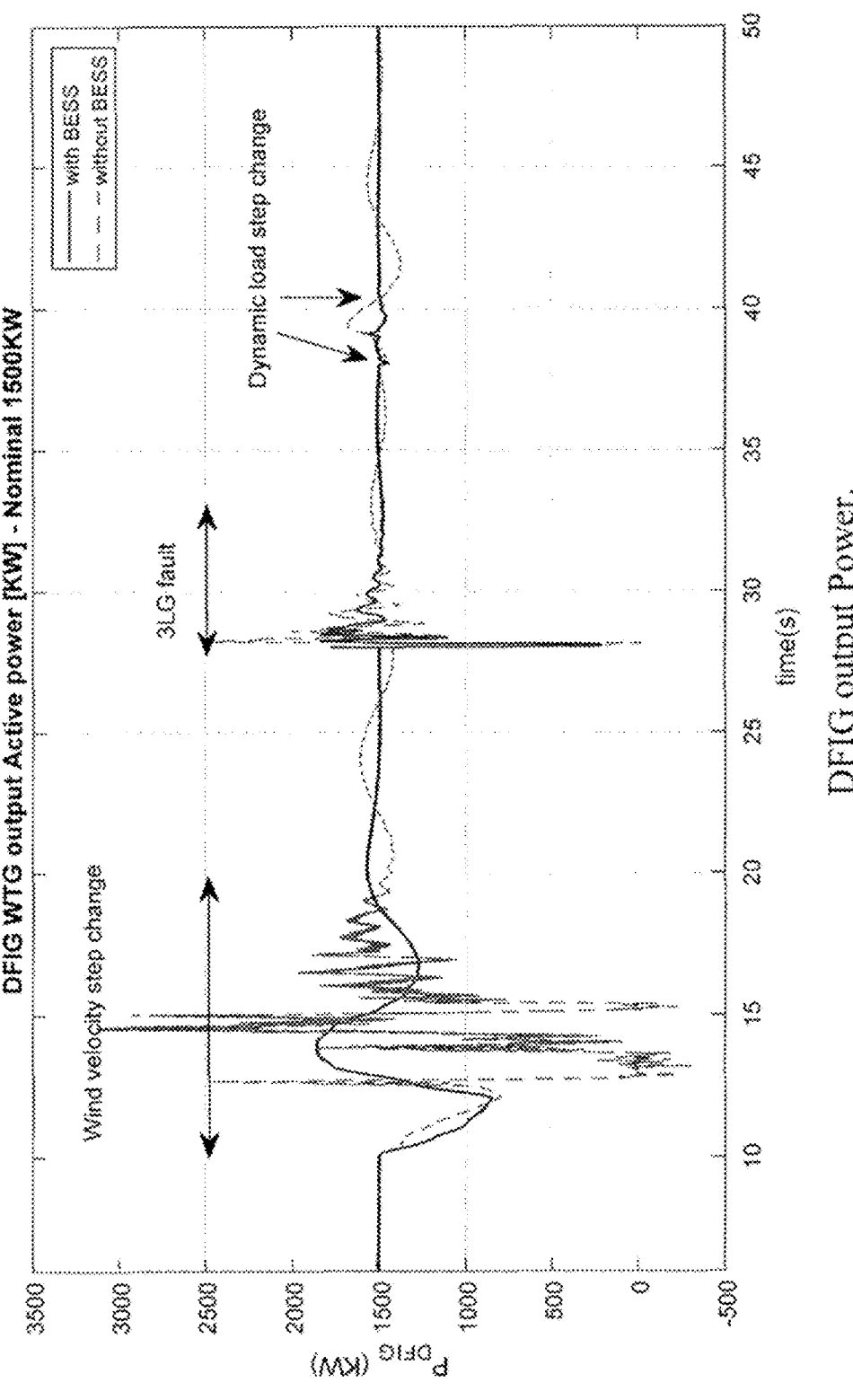
FIG. 10 shows Doubly Fed Induction Generator (DFIG) output power for the system of FIG. 3.
Figure 11:
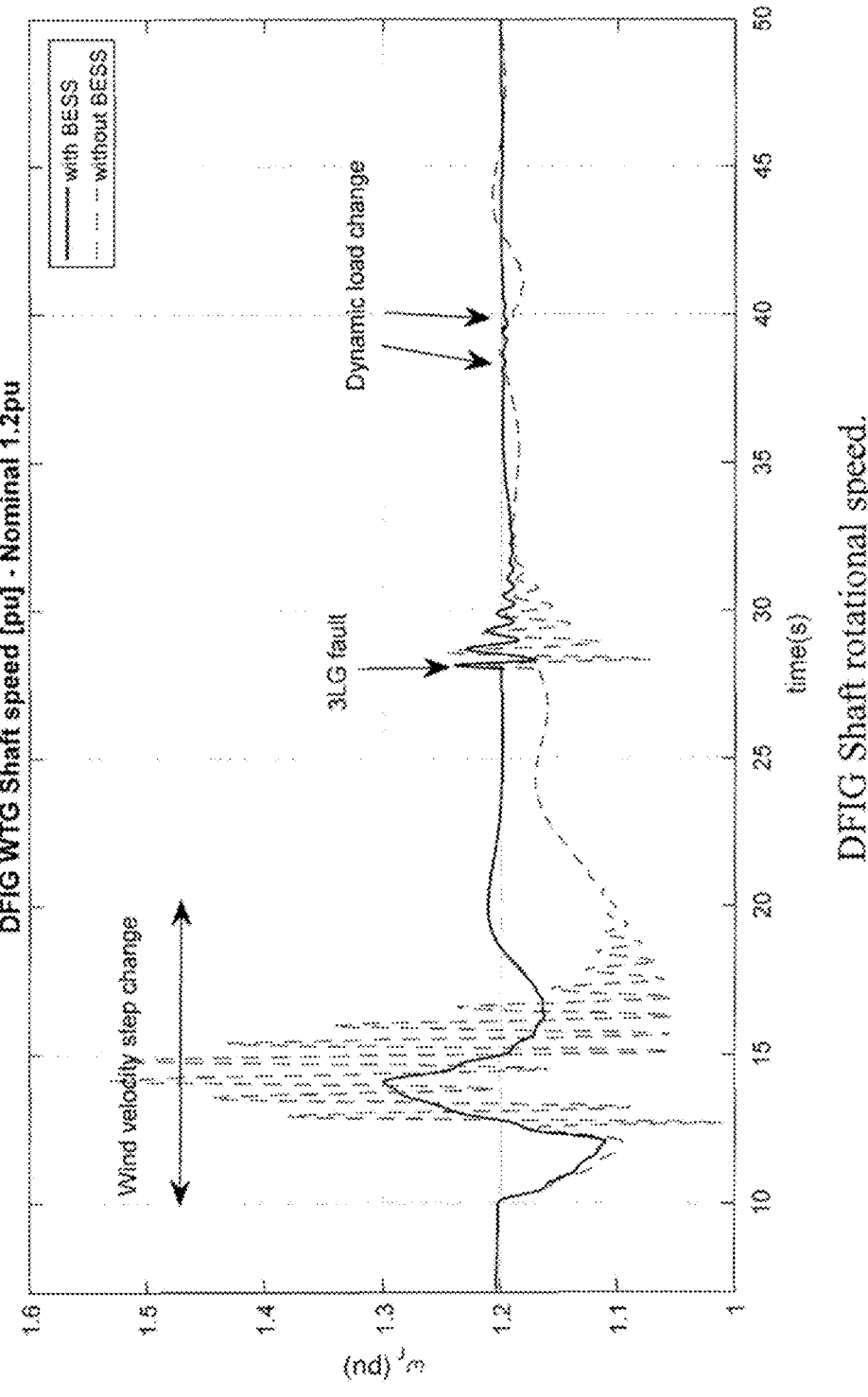
FIG. 11 shows DFIG shaft rotational speed for the system of FIG. 3.
Figure 12:
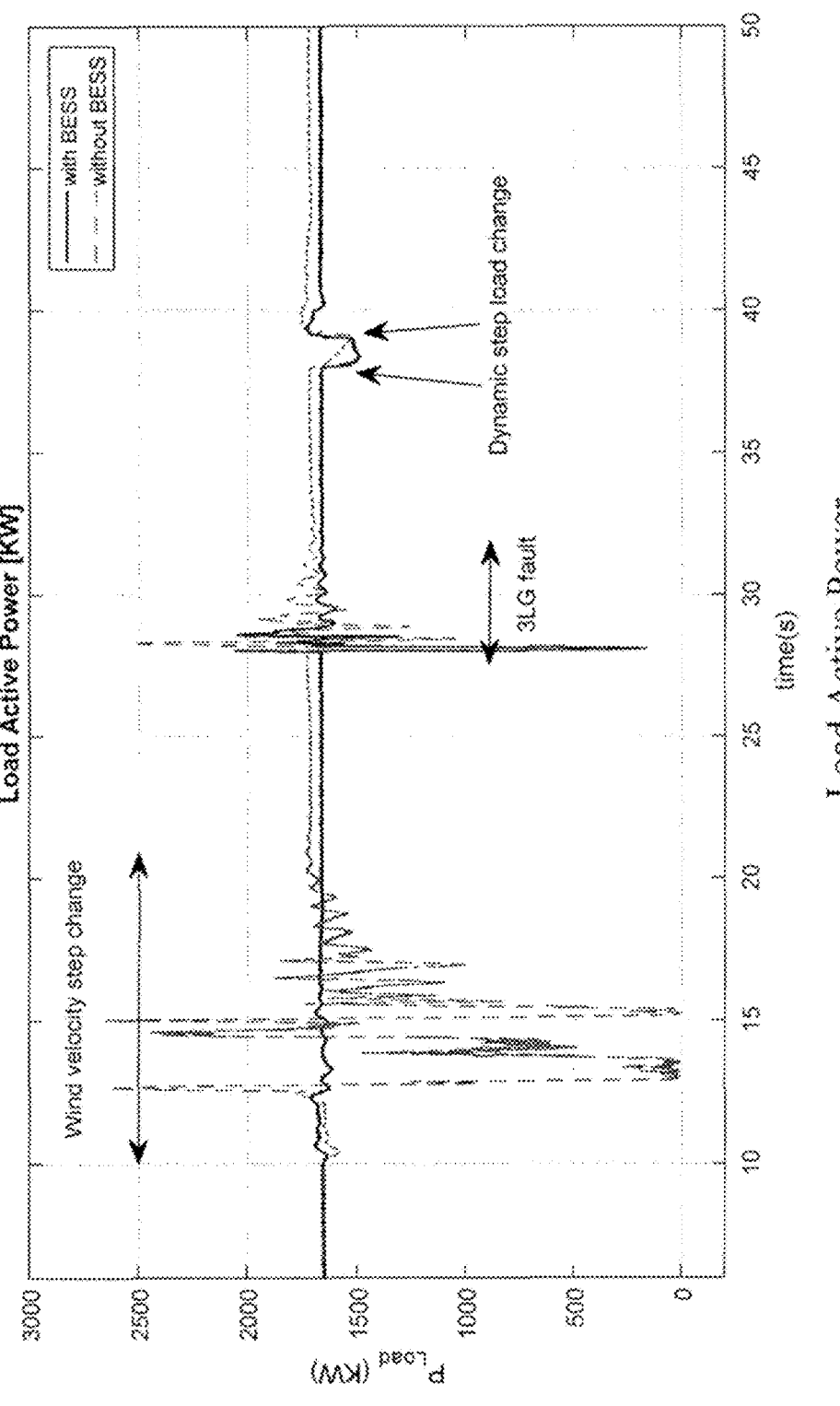
FIG. 12 shows Load active power for the system of FIG. 3.
Figure 13:
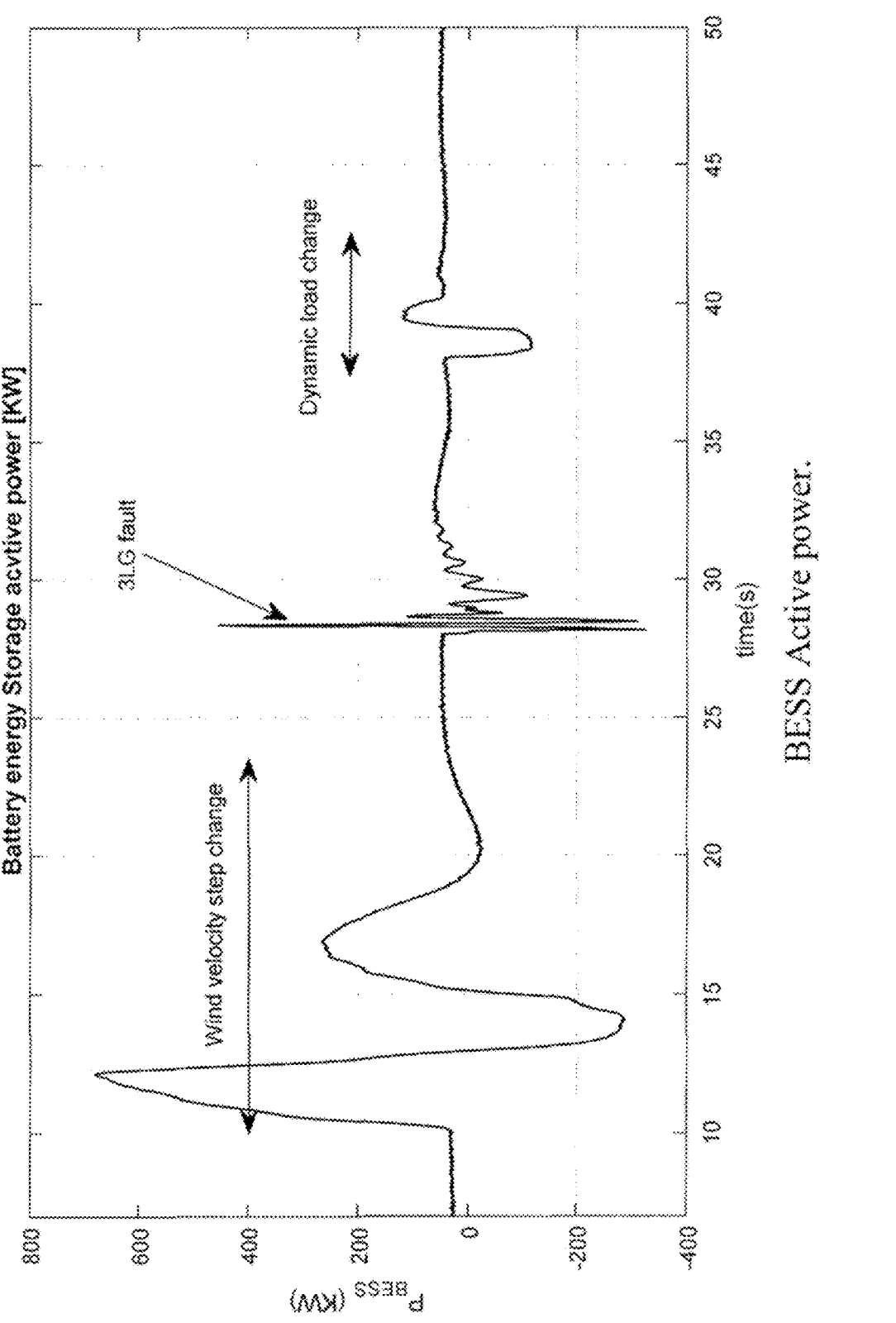
FIG. 13 shows BESS active power for the system of FIG. 3.

FIG. 6 shows an exemplary HMG system 300 in accordance with the present invention. The Medium Voltage (MV) AC sub-grid contains a Doubly Fed Induction Generator (DFIG) based variable speed wind generator 310 and a Diesel Generator (DG) 320, both connected at the point of common coupling (PCC). The wind-diesel generation system in AC sub-grid is collocated with a BESS to provide peak shaving service during wind speed fluctuations and to enhance resiliency against large signal disturbances. The DC sub-grid comprises of Photovoltaic (PV) solar panels 340, a peak shaving BESS 350 for mitigating solar irradiance fluctuations, and constant DC loads 360. FIG. 7 shows the various parameters of the HMG system used in this exemplary embodiment.

The HMG system of FIG. 6, as well as the complete control system, have been simulated in a MATLAB\Simulink environment with detailed switching models for all power electronic devices. The sample time for discrete time simulations is chosen as 5 μs. Therefore, with detailed modeling and very short sample time it is ensured that system dynamics and performance evaluation are reflected with highest accuracy.

FIGS. 8 to 13 show the responses of various variables of the HMG system with and without the proposed BESS under three major disturbances as described below. From the responses, it has been shown that the proposed BESS can not only perform its typical function of minimization of frequency and power fluctuations during wind speed/solar irradiance change, but also can maintain the transient stability and enhance the resiliency of the HMG system under fault condition as well as the load change situation. In other words, the BESS can effectively perform three functions in the HMG environment.

Disturbance 1—Wind speed variation: Intermittent wind velocity is simulated by two step changes. The nominal velocity is 14 m/s. A disturbance is simulated by wind velocity change to 60% and 140%, each for 2.0 sec duration, at the time of 10.0 sec and 12.0 sec, respectively.

Disturbance 2—Fault at AC sub-grid: A 100% three-line-to-ground (3LG) short circuit, which is considered as the severest fault in a power network, is applied at the location F in FIG. 6 at $T_f$=28.0 sec for a duration of 133 ms (i.e., 8 cycles).

Disturbance 3—Dynamic load step change: A step change in dynamic load happens in AC subgrid for a duration of 2.0 sec. This load is a 205 KW variable induction motor that emulates a highly nonlinear and dynamic performance. The nominal mechanical torque of motor is 1100 N-m. A disturbance is simulated by a step change in mechanical torque to 20% and a step change to 120% of nominal torque, each for 1.0 sec duration, at the time of 38 sec and 39 sec, respectively.

The present invention comprises significant advantages over the prior art in that the BESS can be utilized for resiliency enhancement during large signal disturbances in an HMG system. In other words, the BESS can maintain the transient stability during any fault conditions as well as any load change situations, in addition to its typical function of minimization of frequency and power fluctuations during wind speed/solar irradiance change. The BESS thus is used to improve the resiliency of the HMG, resulting in a savings from foregoing the cost of putting auxiliary devices in during fault conditions and load change situations.

Some aspects of a system in accordance with the present invention may be controlled through computer-implemented systems, hardware, and programs. In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A hybrid microgrid system with improved battery energy storage, comprising:

a hybrid AC/DC microgrid comprising an AC sub-grid and a DC sub-grid, said AC sub-grid comprising a variable speed wind generator and a diesel generator, and said DC sub-grid comprising an array of photovoltaic solar panels; and a triple function battery energy storage system connected via a bi-directional inverter to the AC sub-grid or the DC sub-grid, the inverter controlled to transfer power between the battery energy storage system to the AC sub-grid or the DC sub-grid by a controller providing switch control signals to the inverter and one or more of said variable speed wind generator, diesel generator, and array of photovoltaic solar panels, said triple function battery energy storage system comprising a dual loop decoupled control system implementing a droop-based control method and a grid-feeding strategy;

wherein said dual loop decoupled control system is implemented in a Rotational Reference Frame dq system, where d axis corresponds to active power control and q axis corresponds to reactive power control;

wherein the droop-based control system uses P-w and Q-V droops, where w is AC sub-grid voltage, V is AC sub-grid frequency, P is active power, and Q is reactive power;

wherein the control system is configured to track power references for active power, $P_{ref}$ and reactive power, $Q_{ref}$, where power references are defined as $$P_{ref} = P^* - m_p(\omega - \omega^*) \tag{1}$$

$$Q_{ref} = Q^* - n_q(V - V^*)$$

$$m_p \geq \frac{P_{max} - P_{min}}{\omega^*} \tag{2}$$

$$n_p \geq \frac{V_{max} - V_{min}}{V^*}$$

wherein P* is a received active power reference value, Q* is a received reactive power reference value, $\omega^*$ is a voltage rated set point of the AC sub-grid, V* is a frequency rated set point of the AC sub-grid, Pmax is a maximum active power value, Pmin is a minimum active power value, Vmax is a maximum AC sub-grid frequency value, Vmin is a minimum AC sub-grid frequency value, and mp and nq are droop gains for power sharing; and wherein the control system is configured to control the active power and reactive power absorbed and injected by the inverter with the hybrid AC/DC microgrid; and wherein said control system is adapted to reduce frequency fluctuations and power fluctuations in the hybrid AC/DC microgrid during a change in wind speed or solar irradiance by setting the active power reference value, P*, equal to a power balance mismatch calculated by subtracting a total amount of power supplied to the hybrid AC/DC microgrid from a total load power drawn from the hybrid AC/DC microgrid, and setting the reactive power reference value, Q*, equal to zero, to thereby control the battery energy storage system inverter to absorb or inject the amount of power balance mismatch between load and generation.

2. The system of claim 1, wherein the hybrid AC/DC microgrid does not include a series dynamic braking resistor (SDBR) or a fault current limiter.

3. The system of claim 1, wherein said control system is adapted to control the inverter output to track the droop adjusted active and reactive power references in order to maintain transient stability during any fault condition in the hybrid AC/DC microgrid and during a change in load in the hybrid AC/DC microgrid.

4. The system of claim 1, wherein the battery energy storage system is configured as an active power device to control the flow of energy in the hybrid AC/DC microgrid.

5. The system of claim 1, wherein the control system further comprises proportional-integer (PI) controllers.

6. The system of claim 5, wherein the PI controllers operate based on a set of PI regulator coefficients: Kp, Ki.

7. The system of claim 6, wherein the set of PI regulator coefficients remains constant during any type of disturbance to the hybrid AC/DC microgrid.

* * * * *